United States Patent
Inomata et al.

(10) Patent No.: US 9,988,121 B2
(45) Date of Patent: Jun. 5, 2018

(54) BODY COVER STRUCTURE FOR STRADDLE TYPE VEHICLE

(71) Applicant: HONDA MOTOR CO., LTD., Tokyo (JP)

(72) Inventors: Osami Inomata, Wako (JP); Koji Miwa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 15/009,089

(22) Filed: Jan. 28, 2016

(65) Prior Publication Data
US 2016/0264201 A1    Sep. 15, 2016

(30) Foreign Application Priority Data

Mar. 13, 2015 (JP) .................. 2015-050563

(51) Int. Cl.
| | |
|---|---|
| B62J 37/00 | (2006.01) |
| B62J 17/00 | (2006.01) |
| B62K 11/04 | (2006.01) |
| B60K 11/08 | (2006.01) |
| B60K 15/01 | (2006.01) |
| B60T 8/17 | (2006.01) |
| B60T 8/176 | (2006.01) |

(Continued)

(52) U.S. Cl.
CPC ............... *B62J 37/00* (2013.01); *B60K 11/08* (2013.01); *B60K 15/01* (2013.01); *B60T 8/1706* (2013.01); *B60T 8/176* (2013.01); *B62J 17/00* (2013.01); *B62J 35/00* (2013.01); *B62K 11/04* (2013.01); *F02M 51/04* (2013.01)

(58) Field of Classification Search
CPC . B62J 37/00; B62J 17/00; B62J 35/00; B60K 11/08; B60K 15/01; B60T 8/1706; B60T 8/176; B62K 11/04; F02M 51/04
See application file for complete search history.

(56) References Cited

U.S. PATENT DOCUMENTS

| | | | |
|---|---|---|---|
| 7,537,077 B2 * | 5/2009 | Nakashima | B62J 17/00 180/229 |
| 7,556,115 B2 * | 7/2009 | Iwanaga | B62J 99/00 180/219 |

(Continued)

FOREIGN PATENT DOCUMENTS

| | | |
|---|---|---|
| JP | 2001-106150 | 4/2001 |
| JP | 2010-274851 | 12/2010 |

*Primary Examiner* — Joseph M Rocca
*Assistant Examiner* — Marlon A Arce
(74) *Attorney, Agent, or Firm* — Rankin, Hill & Clark LLP

(57) ABSTRACT

In an off road vehicle having a cradle type vehicle body frame, an electrical component is arranged forwardly of rider's legs. A vehicle body frame includes a head pipe, a main frame, a pivot frame, a down frame and a lower frame so as to be formed in a cradle of a closed loop shape in a side view. An engine is supported inside the cradle, and a fuel tank is arranged above the cradle. A vehicle body cover for covering the engine and the fuel tank includes a tank shroud, a side cover and an under cover. A portion of the side cover swells laterally and has an apex located within the cradle on the lateral side of a cylinder section. A fuel pump or an ABS unit as a heavy electrical component is arranged on the inside of the apex.

14 Claims, 9 Drawing Sheets

(51) Int. Cl.
  *B62J 35/00*  (2006.01)
  *F02M 51/04*  (2006.01)

(56) References Cited

U.S. PATENT DOCUMENTS

| | | | |
|---|---|---|---|
| 8,672,422 B2 * | 3/2014 | Tamura | B60T 8/3685 |
| | | | 180/219 |
| 2007/0069545 A1 | 3/2007 | Katagiri et al. | |
| 2009/0218152 A1 | 9/2009 | Oohashi et al. | |
| 2011/0180345 A1 * | 7/2011 | Iida | B62K 11/04 |
| | | | 180/309 |
| 2013/0015008 A1 * | 1/2013 | Yama | B62J 35/00 |
| | | | 180/68.6 |
| 2015/0041232 A1 | 2/2015 | Takatsuka et al. | |
| 2015/0274001 A1 * | 10/2015 | Hosoya | B62J 17/02 |
| | | | 180/229 |
| 2015/0274240 A1 * | 10/2015 | Matsuo | B62K 19/18 |
| | | | 180/227 |

* cited by examiner

BODY COVER STRUCTURE FOR STRADDLE TYPE VEHICLE

BACKGROUND OF THE INVENTION

Field of the Invention

The present invention relates to a body cover structure for a straddle type vehicle and particularly, to the structure capable of ensuring an arrangement space of a relatively large electrical component.

Description of Related Art

There is disclosed a structure in which, in a two-wheeled motorcycle as an example of straddle type vehicle, a vehicle body cover located in front of driver's legs swells in the lateral direction of a vehicle and an exhaust pipe is arranged in the vehicle body cover. Japanese patent No. 4,294,180 is considered to be a prior art reference.

By the way, in an off road vehicle having a cradle type vehicle body frame, a tank shroud is provided as a vehicle body cover, but there is not provided the body cover which covers an exhaust pipe. However, there may be cases where the off road vehicle is equipped with a fuel injection device, an ABS unit or the like. In this case, also in the off road vehicle, it is desired to have an electric component arranged in front of the driver's legs. Accordingly, it is required that in such off road vehicle, the body cover is formed in an optimum shape which allows the electrical component to be arranged therein.

SUMMARY OF THE INVENTION

In order to solve the above-noted issues, according to a first feature of the present invention, there is provided a body cover structure of a straddle type vehicle having a cradle type vehicle body frame that includes a head pipe, left and right main frames extending rearwardly from the head pipe, left and right pivot frames, which are connected to rear parts of the main frames and extend downwardly so as to be provided with a pivot shaft, a down frame extending downwardly from the head pipe, and left and right lower frames that are connected to a lower part of the down frame and extend rearwardly so as to be connected to lower parts of the pivot frames, an engine supported below the main frame and in front of the pivot frames, a fuel tank supported on the left and right main frames above the engine, a seat supported at a rear of the fuel tank, and a vehicle body cover for covering a lateral part of the vehicle body. The body cover includes left and right tank shroud sections that are arranged so as to extend forwardly from the fuel tank so as to take in traveling air to cool the engine, and a side cover section that is provided with a swelling portion swelling laterally from the tank shroud below the fuel tank so as to cover at least a part of the lower frames in a swelling fashion and has an apex of the swelling portion located in a cradle of the vehicle body frame in a side view. An exhaust pipe and an electrical component are arranged separately on the left and right sides of the vehicle body in an inside space of the swelling portion.

According to the first feature of the present invention, since the exhaust pipe and the electrical component are arranged separately on the left and right sides of the vehicle body in the inside space of the side cover section, the electrical component can be arranged so as not to be influenced by the heat of the exhaust pipe. Moreover, they are located within the side cover below the thank shroud, so that it is possible to lower a center of gravity of the vehicle. In addition, since the apex of the swelling portion is located in a cradle of the vehicle body frame, the electrical component can be supported on and protected by the vehicle body frame, or a stay or a protection member supported by the vehicle body frame.

According to a second feature of the present invention, a radiator is arranged at least on the same side of the electrical component within the left and right tank shroud sections, and the engine includes a cylinder section and a crankcase section extending outwardly in the left and right directions below the cylinder section. The apex is located on a lateral side of the cylinder section and at the rear of the radiator, and an air outlet port is formed in either one or both of the left and right tank shroud sections and the side cover section and located at the rear of the radiator on the upper side of the apex.

According to the second feature of the present invention, since the apex is located on the lateral side of the cylinder section, a space in the vehicle width direction can be increased. Moreover, since the apex is arranged rearwardly of the radiator, a space located at the rear of the radiator can be increased to thereby make it easy to introduce the fresh air into or around the radiator, so that cooling efficiency can be improved.

According to a third feature of the present invention, the side cover section is arranged at the rear of the tank shroud section so as to cover the main frames and the cylinder section from lateral sides and is provided with the apex, and an under cover section is connected to a front part of the side cover section and a lower part of the tank shroud section. The tank shroud section, the side cover section and the under cover section are formed as separate components from each other.

According to the third feature of the present invention, since the tank shroud section, the side cover section and the under cover section are formed as separate components from each other, each of these components can be replaced separately. Therefore, when the side cover section having the swelling portion, which is relatively subject to damage, is damaged, only the side cover section has to be replaced, whereby the cost of replacement parts can be reduced.

According to a fourth feature of the present invention, the electrical component is a fuel pump arranged on an outside of the fuel tank, and fuel piping is arranged between the fuel pump and the fuel tank. The under cover section is configured to cover a front part of the lower frame and at least a portion of a lateral part of the fuel tank in a side view.

According to the fourth feature of the present invention, since the fuel pump to be attached externally is arranged within the side cover section and the fuel piping is covered with the side cover section so as to be made invisible from outside, the external appearance can be improved while protecting the fuel piping.

According to a fifth feature of the present invention, the fuel pump is a cylindrical member having an upper end surface connected to the fuel piping for feeding fuel. The fuel pump is arranged so as to be inclined such that an upper end portion is located on an inward side of the vehicle body and a lower end portion is located on an outward side of the vehicle body.

According to the fifth feature of the present invention, since the fuel pump is formed in a cylindrical shape having the upper end surface connected to the fuel piping for feeding the fuel, and the upper end portion is configured to be inclined toward an inside of the vehicle body, the fuel piping can be directed to a center of the vehicle body so as to be connected to the fuel tank located in the center of the vehicle body, whereby the fuel piping can be shortened.

According to a sixth feature of the present invention, the fuel pump is a cylindrical member having an upper end surface connected to fuel discharge piping for discharging the fuel to a fuel injection device. The fuel pump is arranged such that on the lateral side of the cylinder section, the upper end portion is located toward the rear of the vehicle body and the lower end portion is located toward the front of the vehicle body, and the fuel injection device is arranged at the rear of the cylinder section so as to inject the fuel into an intake port, which is provided on a back side of the cylinder section.

According to the sixth feature of the present invention, the fuel pump is the cylindrical member that has the upper end surface connected to the fuel discharge piping for discharging the fuel to the fuel injection device. The fuel pump is arranged such that on the lateral side of the cylinder section, the upper end portion is located toward the rear of the vehicle body and the lower end portion is located toward the front of the vehicle body. Therefore, the fuel discharge piping can be connected at a short distance to the fuel injection device arranged at the rear of the cylinder section. As a result, the fuel discharge piping can be shortened. In addition, since the fuel pump is not installed in an interior of the fuel tank but arranged in an exterior thereof, a capacity of the fuel tank can be increased accordingly so as to be made larger in size without exerting an influence on an external appearance of the fuel tank.

According to a seventh feature of the present invention, the electrical component is an ABS unit that controls a brake for a front wheel and a rear wheel.

According to the seventh feature of the present invention, since the ABS unit having heavy weight is arranged between the front wheel and the rear wheel on the lateral side of the engine, the mass can be concentrated while shortening oil pressure piping.

BRIEF DESCRIPTION OF THE DRAWINGS

These and further features of the invention will be apparent with reference to the description and drawings, wherein.

DETAILED DESCRIPTION OF THE INVENTION

Figure 1:
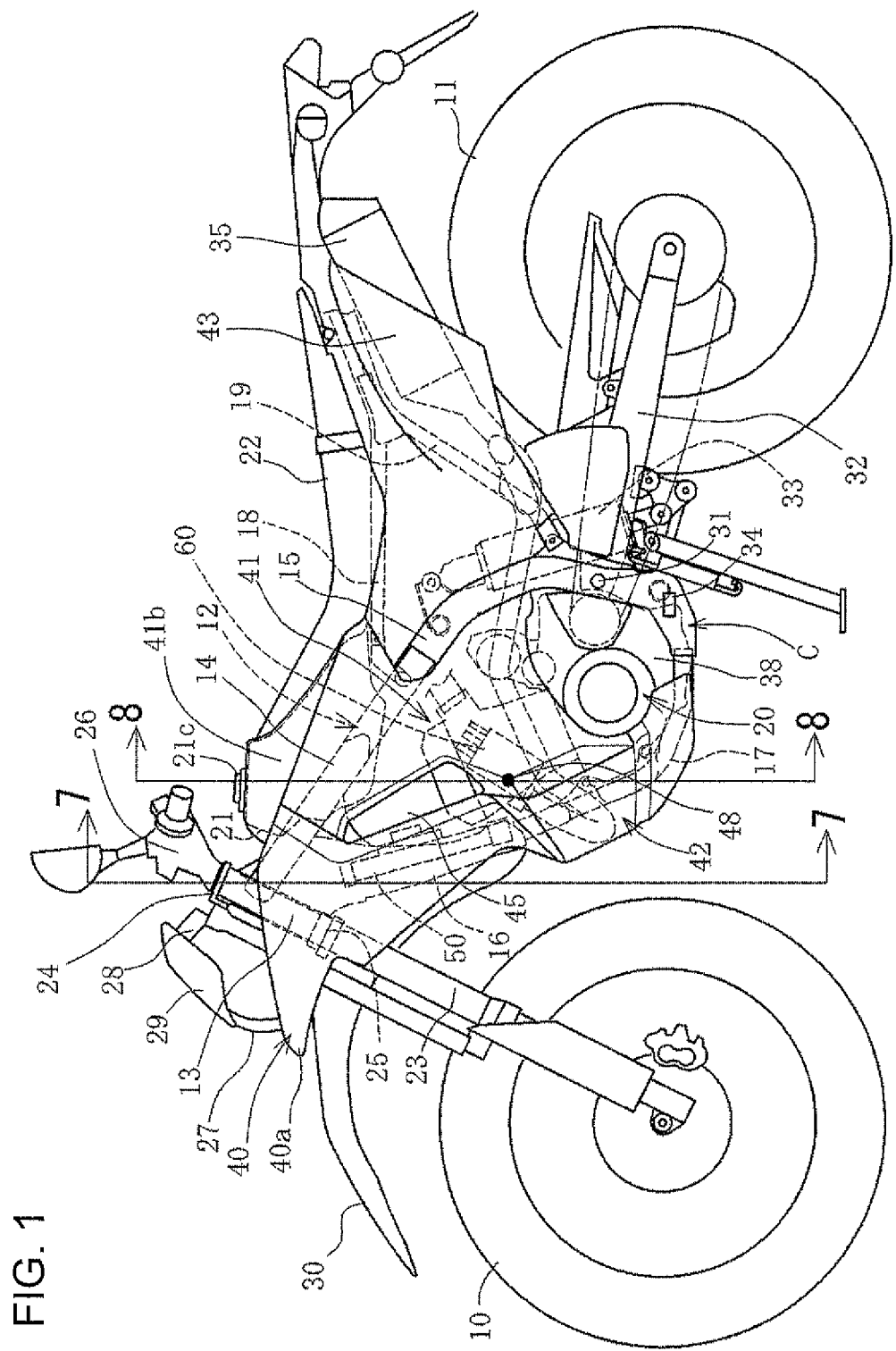
FIG. 1 is a left side view of an off road vehicle in accordance with an embodiment of the present invention.

An embodiment of the present invention, which is applied to an off road two-wheeled motorcycle, will be described with reference to accompanying drawings. First, the whole structure of a vehicle will be described mainly with reference to FIGS. 1 to 4. Referring now to FIG. 1, this two-wheeled motorcycle is provided with a vehicle body frame 12 for supporting a front wheel 10 and a rear wheel 11 thereon. The vehicle body frame 12 includes a head pipe 13 located on a front end part thereof, left and right main frames 14, which extend obliquely downwardly from the head pipe 13 to the rear, left and right pivot frames 15, which extend downwardly from each of rear ends of the main frames 14, a down frame 16, which extends obliquely downwardly from the head pipe 13 to the rear along a center of a vehicle body, lower frames 17, which extend downwardly from a lower end portion of the down frame 16 while being bifurcated left and right, and are curved to extend substantially horizontally to the rear so as to be connected to lower end portions of the pivot frames 15, left and right seat rails 18, which extend substantially horizontally from each rear part of the main frames 14 to the rear, and left and right back stays 19, which extend obliquely so as to provide a connection between each of intermediate portions of the left and right pivot frames 15 and each of intermediate portions of the left and right seat rails 18.

The head pipe 13, the main frame 14, the pivot frame 15, the down frame 16 and the lower frame 17 form a closed loop in a side view and are configured to be a cradle type frame having an engine 20 supported on an inside of the closed loop. This closed loop structure in a side view of the vehicle body frame shall be referred to as a cradle C.

A fuel tank 21 is located above the engine 20 and supported on the main frames 14. To the rear of the fuel tank 21, a seat 22 is arranged and supported on the seal rails 18.

The front wheel 10 is carried on lower end portions of left and right front forks 23. Upper parts of the front forks 23 are rotatably supported on the head pipe 13 through a top bridge 24 and a bottom bridge 25. A bar handle 26 is mounted on the top bridge 24, and the front wheel 10 is steered by the bar handle 26.

A head light 27 and a meter 28 are supported in front of the head pipe 13. The meter 28 is covered on the front side thereof with a meter visor 29. A reference character 30 designates a front fender.

A front end of a rear swing arm 32 is swingably supported on the pivot frames 15 through a pivot shaft 31. The rear wheel 11 is carried on a rear end of the rear swing arm 32.

A shock absorber 33 of a rear suspension device is arranged between an intermediate portion in the forward and rearward direction of the rear swing arm 32 and an upper part of each of the pivot frames 15. A reference character 34 designates a step and 35 a muffler.

The step 34 is a collapsible type that can freely rise and fall and, when being used, rises in such a way as to project laterally outwardly. When a tip of the step 34 is brought into contact with the ground, for example, the step 34 falls and extends substantially parallel to a lateral surface of the vehicle body to thereby be stored.

The mufflers 35 are provided on the left and right sides in pairs and supported on each of rear end portions of the seat rails 18. A downstream end portion of an exhaust pipe 36 is connected to the muffler 35 and an upstream end portion of the exhaust pipe 36 is connected to a front of a cylinder section of the engine 20.

A vehicle body cover for covering lateral sides of the vehicle body including the cylinder section 37 of the engine 20 and the fuel tank 21 includes a tank shroud 40, a side cover 41, an under cover 42 and a rear cover 43. These cover members are made of resin, respectively, and are provided on the left and right sides in pairs.

Figure 4:
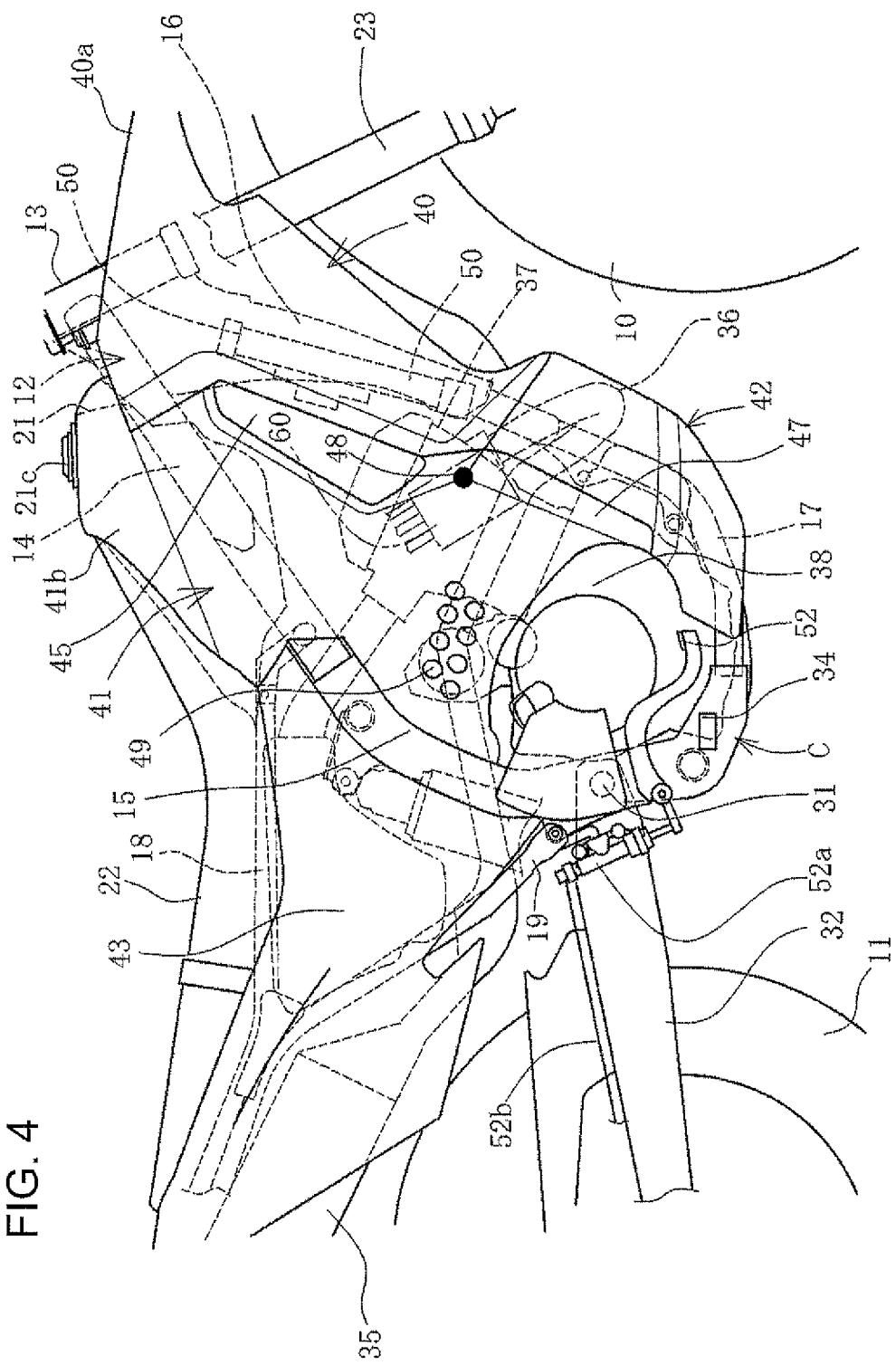
FIG. 4 is a right side view of a front body cover part of the above vehicle.

Further, a lower side of a crankcase 38 of the engine 20 is covered with an engine guard 44 (FIG. 4). In the present invention, a part formed of the tank shroud 40, the side cover 41 and the under cover 42 is referred especially to as a front vehicle body cover.

Figure 9:
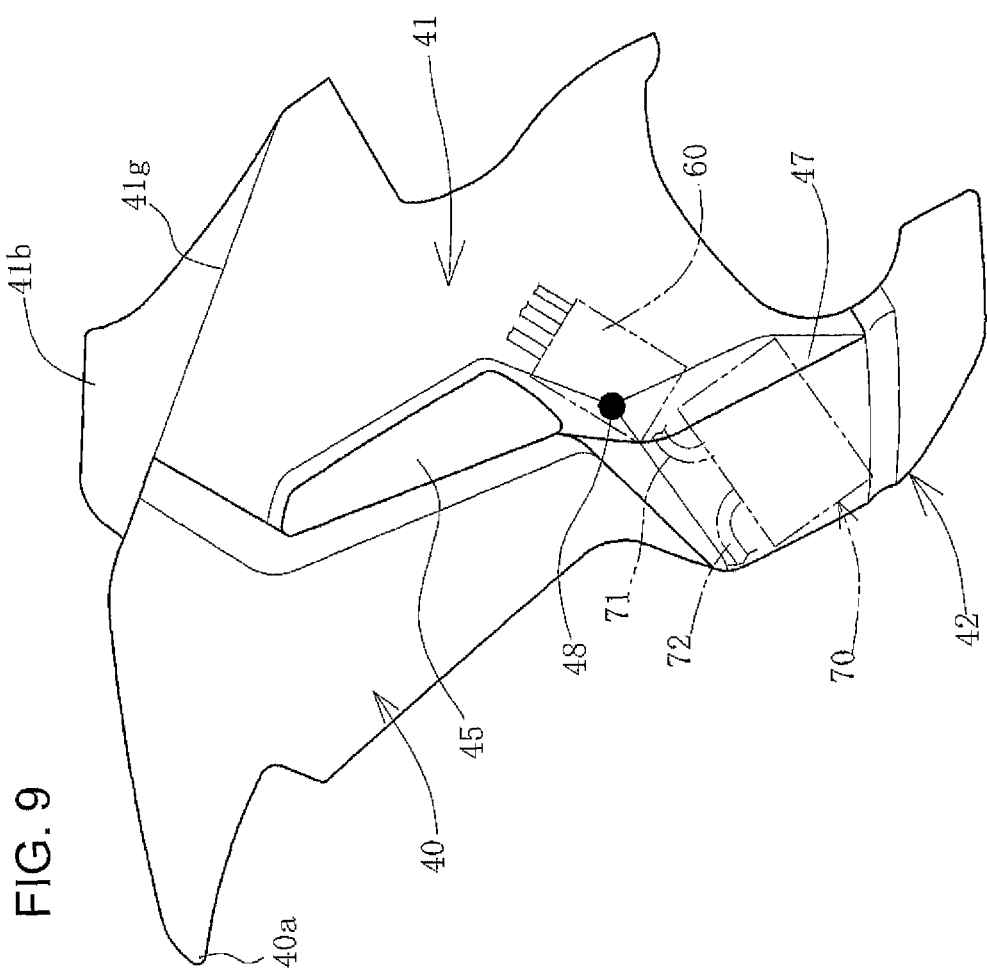
FIG. 9 is a left side view of the front body cover.

Further, the tank shroud 40 corresponds to a tank shroud section of the present invention that extends forwardly of the fuel tank 21 so as to take in traveling air. The side cover 42 corresponds to a side cover section of the present invention that covers a lateral side of an electrical component or the engine. The under cover 42 corresponds to an under cover section of the present invention that covers a lower side of the vehicle body frame or the engine. In addition, a side view of the front vehicle body cover is shown in FIG. 9.

The tank shroud 40 is a member that covers a region from left and right sides of a front part of the fuel tank 21 to lateral sides of the left and right front forks 23, and a front part 40a thereof formed in substantially a triangular shape in a side view projects further forwardly from the front forks 23. Moreover, it covers each lateral side of the down frame 16 and the lower frames 17.

A rear part of the tank shroud 40 is connected to an upper front part of the side cover 41. However, a separated portion, which is not connected, is provided in part, and an opening formed by this separated portion is formed as an air outlet port 45.

In this embodiment, a radiator 50 is arranged in front of the air outlet port 45 and supported on the down frame 16.

The tank shroud 40 covers outer lateral sides of the radiator 50 so as to function as a radiator shroud, and the air outlet port 45 is configured to discharge hot exhaust air of the radiator 50 toward an outside of the vehicle.

However, in the case where the engine 20 is an air cooled type, the radiator 50 is not provided, and the air outlet port 45 discharges outwardly of the vehicle the hot air, which may be easily dense in an interior of the front vehicle body cover.

A lower end portion of the tank shroud 40 is connected to an upper end portion of the under cover 42. The under cover 42 covers at least a part of the lower frames 17 and has a rear end portion connected to a laterally outwardly projecting swelling portion 47, which is provided in a lower front part of the side cover 41. The side cover 41 is configured to cover a lateral side of the cylinder section 37 of the engine 20, a lateral side of the fuel tank 21 and a front part of the seat 22.

Figure 2:
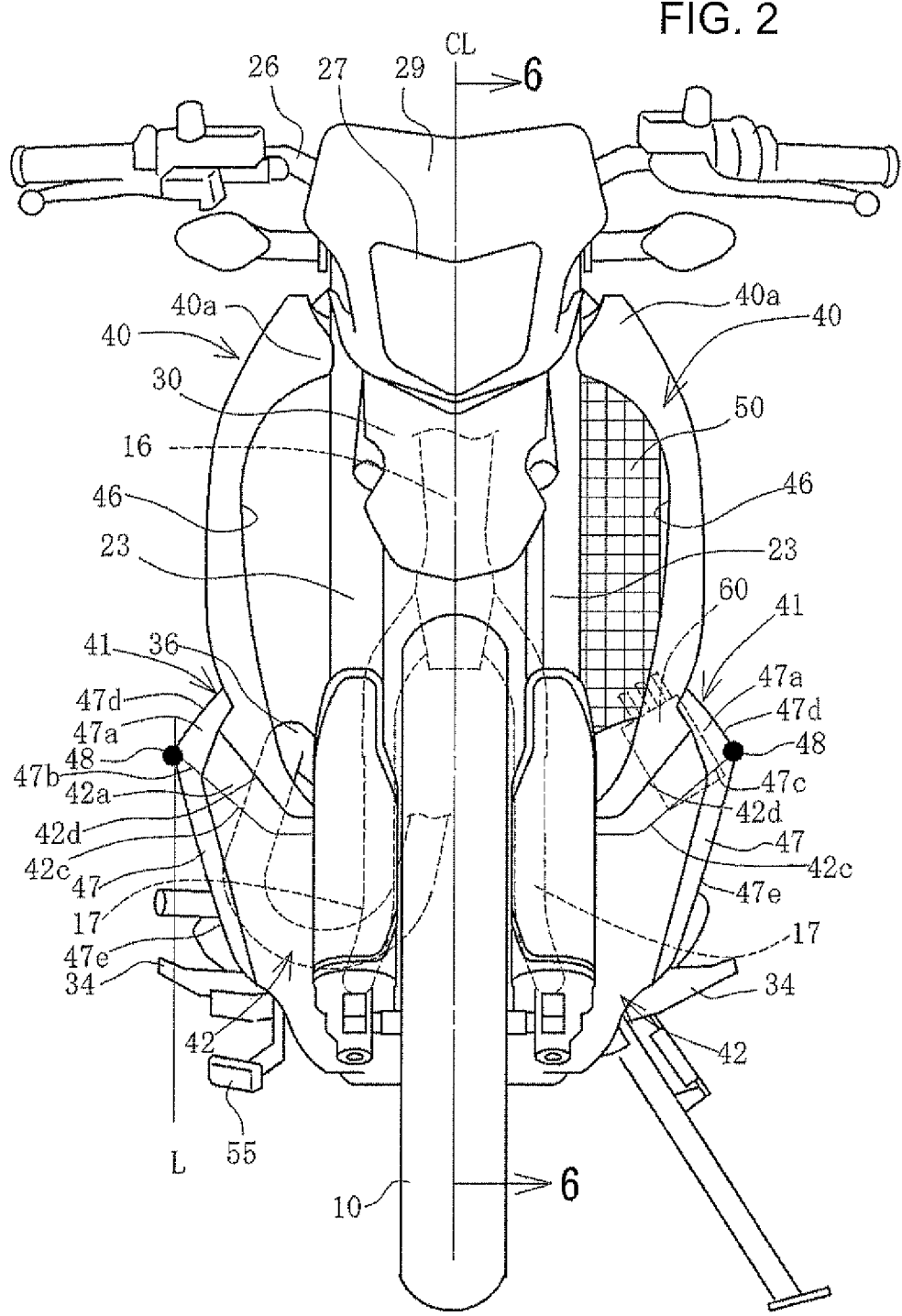
FIG. 2 is a front view of the above vehicle.

As shown in FIG. 2, the front part 40a of the tank shroud 40 has a front edge portion, which is formed in the shape of a laterally outwardly convexed curve and forms an air inlet port 46 which opens forward between the left and right tank shrouds 40. Although the tank shrouds 40 are provided symmetrical with respect to each other in pairs, the radiator 50 is arranged on only one side of the vehicle body (on the left side of the vehicle body in this embodiment). The radiator 50 faces into the air inlet port 46 on the left side of the vehicle body in such an arrangement that an air receiving surface (front face) thereof faces forward.

Figure 3:
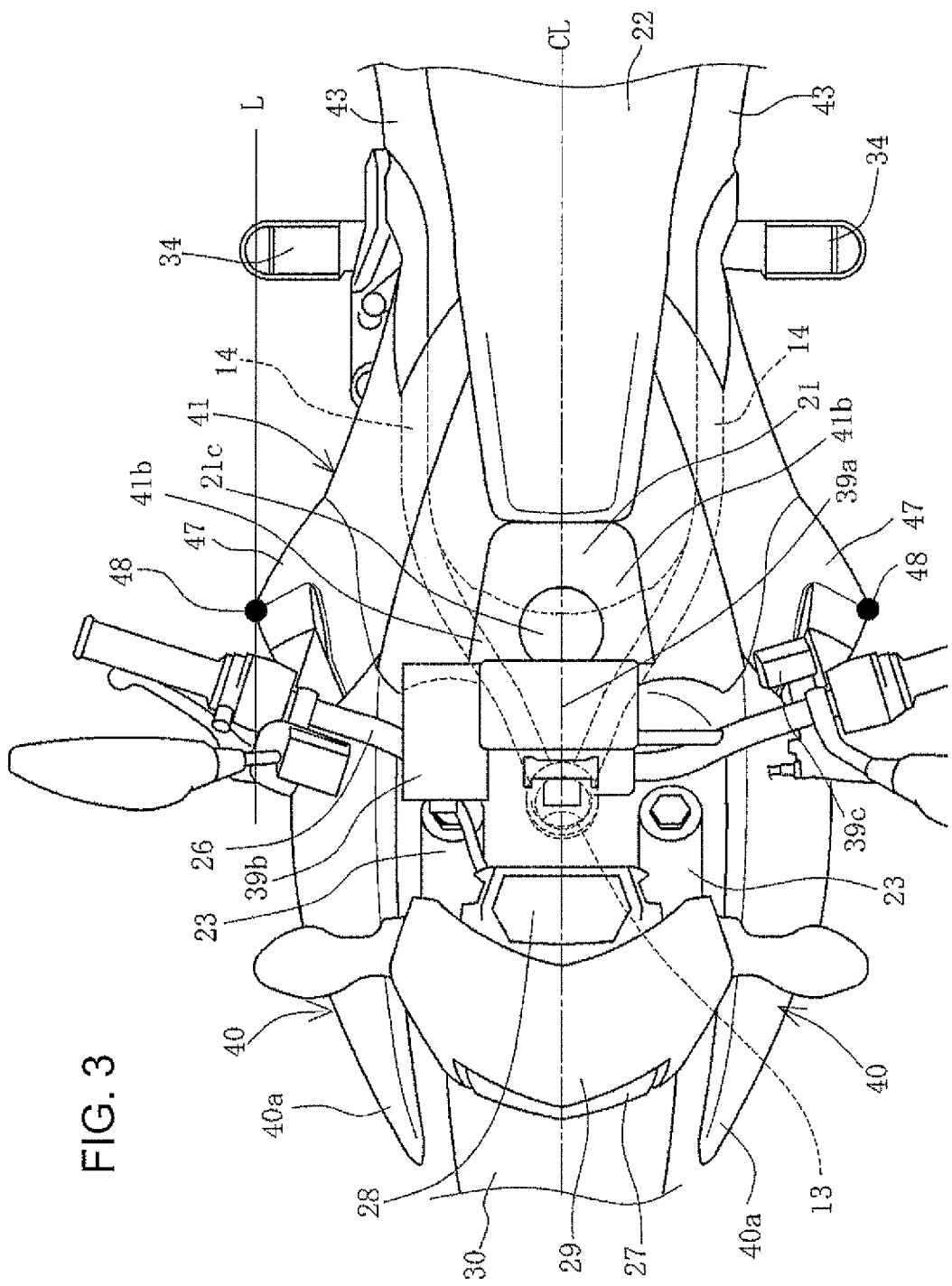
FIG. 3 is a top plan view of a front part of the above vehicle.

As shown in FIG. 3, the front parts 40a of the left and right tank shrouds 40 extend long forwardly so that the traveling air W is taken in between the left and right tank shrouds 40 so as to be lead to the rear.

At that time, on the left side in the left and right direction of the vehicle, the traveling air cools the radiator 50 and is discharged from the air outlet port 45. On the right side of the vehicle, it enters inwardly from the air inlet port 46 and is directed to the exhaust pipe 36 and the cylinder section 37 to cool them.

By the way, an upper part 41b of the side cover 41 covers a circumference of an upper part of the fuel tank 21 in a state that a cap 21c is exposed in a side view.

In FIG. 3, a reference character 39a designates a navigation device display section, 39b an ETC unit, and 39c a navigation operation switch.

Hereinafter, the front vehicle body cover will be described in detail mainly with reference to FIGS. 4 and 5.

FIG. 4 shows the front vehicle body cover on the right side of the vehicle. The left and right front vehicle body covers have the same structure of a symmetrical shape unless an air vent 49 to be referred to later is provided in the right side cover 41. In addition, FIG. 5 is an exploded side view of the left front body cover, showing an assembly of each of component parts in a disassembled state.

The tank shroud 40 as a whole is convexly curved in the laterally outward direction. With this convexly curved structure, the air inlet port 46 on the front side and the air outlet port 45 on the rear side are formed. A rear edge portion of the tank shroud 40 is bent in substantially a V-shape and has a rear edge upper portion 40b on the upper side of the bent portion and a rear edge lower portion 40c on the lower side thereof. The rear edge lower portion 40c constitutes a front side opening edge portion of the air outlet port 45. A lower end portion 40d is inclined obliquely downwardly to the front.

The side cover 41 includes a front edge upper portion 41a, which is inclined at the same angle with the rear edge upper portion 40b of the tank shroud 40 in a side view, a rearwardly inclined upper portion 41b, which covers the upper part of the fuel tank 21, a rear edge portion 41c formed with a forwardly recessed groove into which a front end portion of the rear cover 43 is fitted, a lower edge portion 41d, which is curved so as to form a clearance for allowing a portion of the crankcase section 38 to be exposed, a rear side air outlet port edge portion 41e, which is continuous with a lower part of the front edge upper portion 41a and has a rearwardly recessed concave shape so as to form a rear side opening edge portion of the air outlet port 45, and a swelling portion front edge section 47b, which is continuous with a lower part of the rear side air outlet port edge portion 41e. The upper portion 41b is partitioned from an upper end part of a main body portion 41f by a step portion 41g, which is inclined rearwardly from an upper end part of the front edge upper portion 41a toward a front lower part of the seat 22. The upper portion 41b extends upwardly while being recessed a little inwardly at the step portion 41g and covers the circumference of the fuel tank 21.

The main body portion 41f of the side cover 41 other than the upper portion 41b and the swelling portion 47 is continuous with an upper bump section 47a and a rear bump section 47f of the swelling portion 47 and is formed of a concave, which is recessed one step with respect to the swelling portion 47. The main body portion 41f as a whole is flat. This main body portion 41f is a portion with which a rider's legs overlap from outside. A distance in the vehicle width direction between the left and right main body portions 41f is narrowed so as to make it easy to move the legs. Moreover, an upper part of the main body portion 41f located on the lateral side of the fuel tank 21 is formed with a knee grip part. In addition, the swelling portion 47 located forwardly of the legs projects laterally outwardly of the vehicle body, so that the legs are covered with the swelling portion 47. The swelling portion 47 will be described in detail later.

The side cover 41 is connected to the rear edge upper portion 40b of the tank shroud 40 and overlaps with it in a side view. The rear side air outlet port edge portion 41e is spaced apart from and arranged face to face with the rear edge lower portion 40c of the tank shroud 40 in a side view.

Moreover, since the rear side air outlet port edge portion 41e is flat and the rear edge lower portion 40c of the tank shroud 40 is curved laterally outwardly, an air outlet port 45, which is formed with a relatively large opening area between the rear edge lower portion 40c and the rear side air outlet port edge portion 41e and which opens outwardly and laterally, is formed merely by connecting the side cover 41 to the rear side of the tank shroud 40.

The under cover 42 has an upper end part formed with an upper bump section 42a, and the upper end part is continuous through a ridgeline 42c with an upper portion 42b. The upper bump section 42a is a slant surface that is inclined inwardly toward the upper side from the ridgeline 42c. The lower end portion 40d of the tank shroud 40 is connected to a distal end portion of the upper bump section 42a. Moreover, also in a lower part of the under cover 42, a lower bump section 42f is formed in the shape of a slant surface that is inclined in the opposite direction to the upper bump section 42a and is recessed at a ridgeline 42g with respect to a main body portion 42e. A bottom part is located below a valley line 42h. In this embodiment, the ridgeline and the valley line are indicated by a thin line. In addition, a partition part of the vehicle body cover is indicated by a thick line.

An upper part of a rear edge portion 42d located above the ridgeline 42g is configured to overlap with the swelling portion front edge section 47b of the side cover 41. A rear edge lower portion 42i of a lower part located below the valley line 42h is continuous with the lower edge portion 41d of the side cover 41 and curved in such a way as to form a clearance from which the crankcase 38 is exposed.

The lower part located below the valley line 42h is substantially flush with and connected to a lower part of the main body portion 41f of the side cover 41.

Figure 5:
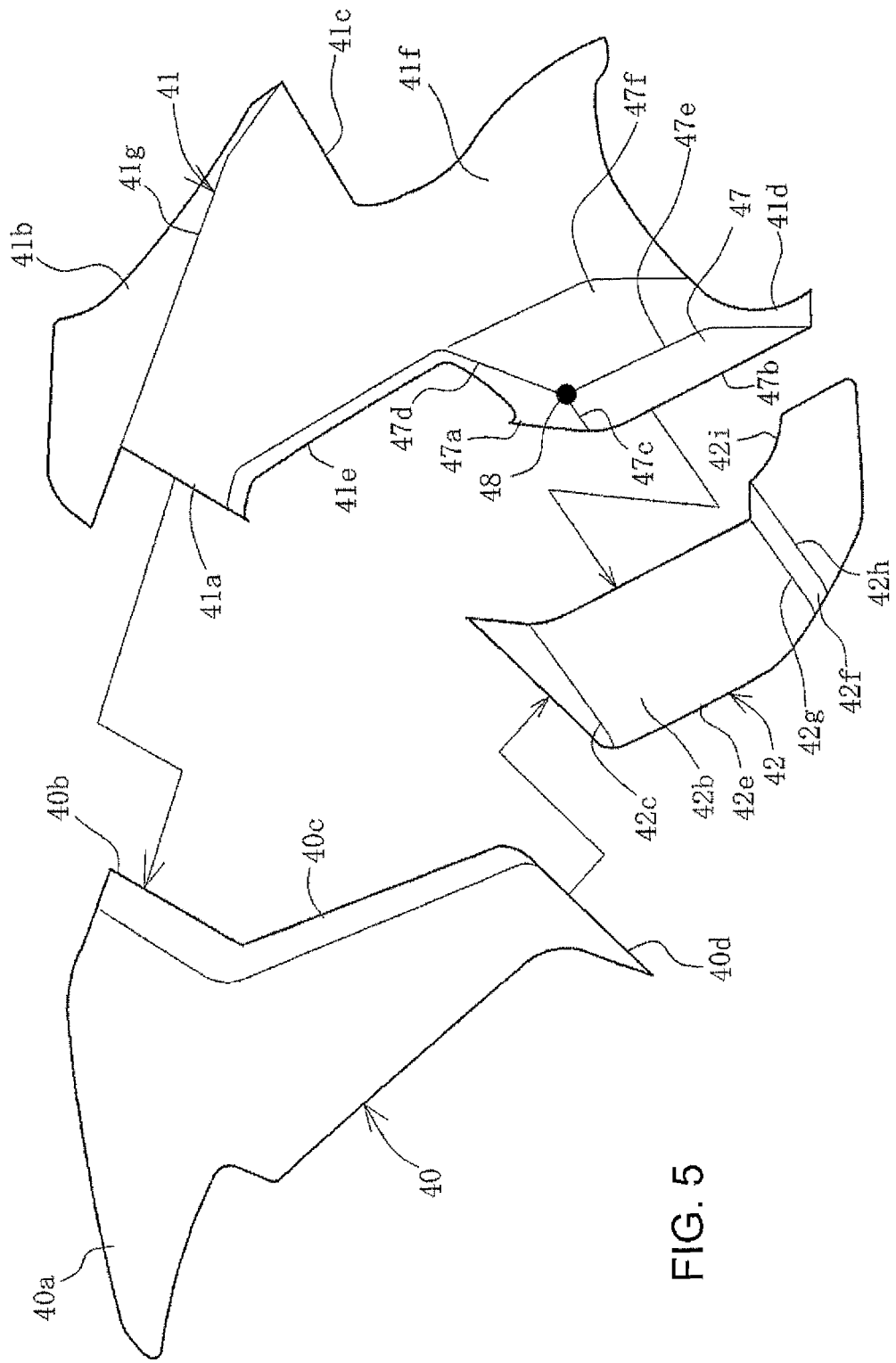
FIG. 5 is an exploded view of each component part of the front body cover.

As shown in FIG. 5, the swelling portion 47 is located below the tank shroud 40. The upper bump section 42a and the rear bump section 47f each are inclined so as to project laterally outwardly, so that a laterally outwardly enlarged swelling space 58 (see FIG. 8) is formed inside the swelling portion 47. The swelling portion 47 is defined by a ridgeline 47c extending in the forward and rearward direction along the upper bump portion 42a, a ridgeline 47d extending in the upward and downward direction and being inclined rearwardly toward the rear side air outlet port edge portion 41e, and a ridgeline 47e extending in the upward and downward direction along the swelling portion front edge section 47b. These three ridgelines intersect at one point, and the intersecting point forms an apex 48 of the swelling portion 47.

As shown in FIG. 3, the apex 48 is a most laterally projecting portion of the vehicle. A straight line L passing through the apex 48 and extending in parallel with a vehicle center CL passes through substantially a distal end portion of the step 34 in a laterally projecting state of the step 34 at the time of normal use. As shown in FIG. 4, the apex 48 is located inside the closed loop of the cradle part C of the vehicle body frame 12. In addition, it is located on the lateral side of the cylinder section 37.

Further, the swelling portion front edge section 47b of the side cover 41 is connected flush with the rear edge portion 42d of the under cover 42, so that the swelling portion 47 of the side cover 41 is connected flush with the main body portion (swelling portion) 42e of the under cover 42. At that time, the upper bump section 42a of the under cover 42 is connected continuous with the ridgeline 47c in the forward and rearward direction of the side cover 41, and the lower bump section 42f of the under cover 42 is connected continuous with a lower end portion of the ridgeline 47e in the upward and downward direction of the side cover 41.

Further, the lower end portion 40d of the tank shroud 40 is connected to the distal end portion of the upper bump section 42a. Therefore, the lower end portion 40d is located in an inwardly recessed position corresponding to a projection amount of the upper bump section 42a. At the same time, the main body portion 42e and the swelling portion 47 project laterally outwardly from the lower end portion 40d of the tank shroud 40, and also the under cover 42 projects forwardly With this structure, a large volume article arrangement space (the swelling space 58) is ensured in the interior of the front vehicle body cover.

By utilizing this swelling space 58, the electrical component to be referred to later is arranged on the left side of the vehicle body and the exhaust pipe 36 is arranged on the right side of the vehicle body. As shown in FIG. 4, a plurality of air vents 49 are provided in a part of the right side cover 41 located on the lateral side of the exhaust pipe 36, so that the hot air, which may be easily dense in the interior of the side cover due to the exhaust pipe 36, can be rapidly discharged outwardly of the side cover 41. The number and size of the air vents 49 may be freely selected.

Herein, the air vents 49 are provided in the side cover 41 only on the right side and are not provided in the side cover 41 on the left side where the exhaust pipe 36 is not arranged. Moreover, the air outlet port 45 is provided also on the right side of the vehicle body where the radiator 50 is not arranged, and the hot air, which may be easily dense in the interior of the front vehicle body cover formed of the side cover 41 and others, is discharged outwardly from the air outlet port 45.

Since the side cover 41 has the swelling portion 47 that projects outwardly on the lateral side of the vehicle body, the possibility of damages may be increased. In addition, the under cover 42 may be more likely to be damaged by a stone, etc. thrown up by the rear wheel 11. Accordingly, the tank cover 40, the side cover 41 and the under cover 42 are molded separately from each other, so that they are replaceable separately when damaged.

By the way, in FIG. 4, a reference character 52 designates a brake pedal, a rear end portion of which is connected to a master cylinder 52a located rearwardly of the step 34. An oil pressure is applied from the master cylinder 52a through a brake hose 52b to a rear wheel brake (not shown). When pressing down the brake pedal 52, a braking operation by the rear wheel brake is performed.

Next, a layout of component parts on the inside of the front vehicle body cover will be described.

Figure 6:
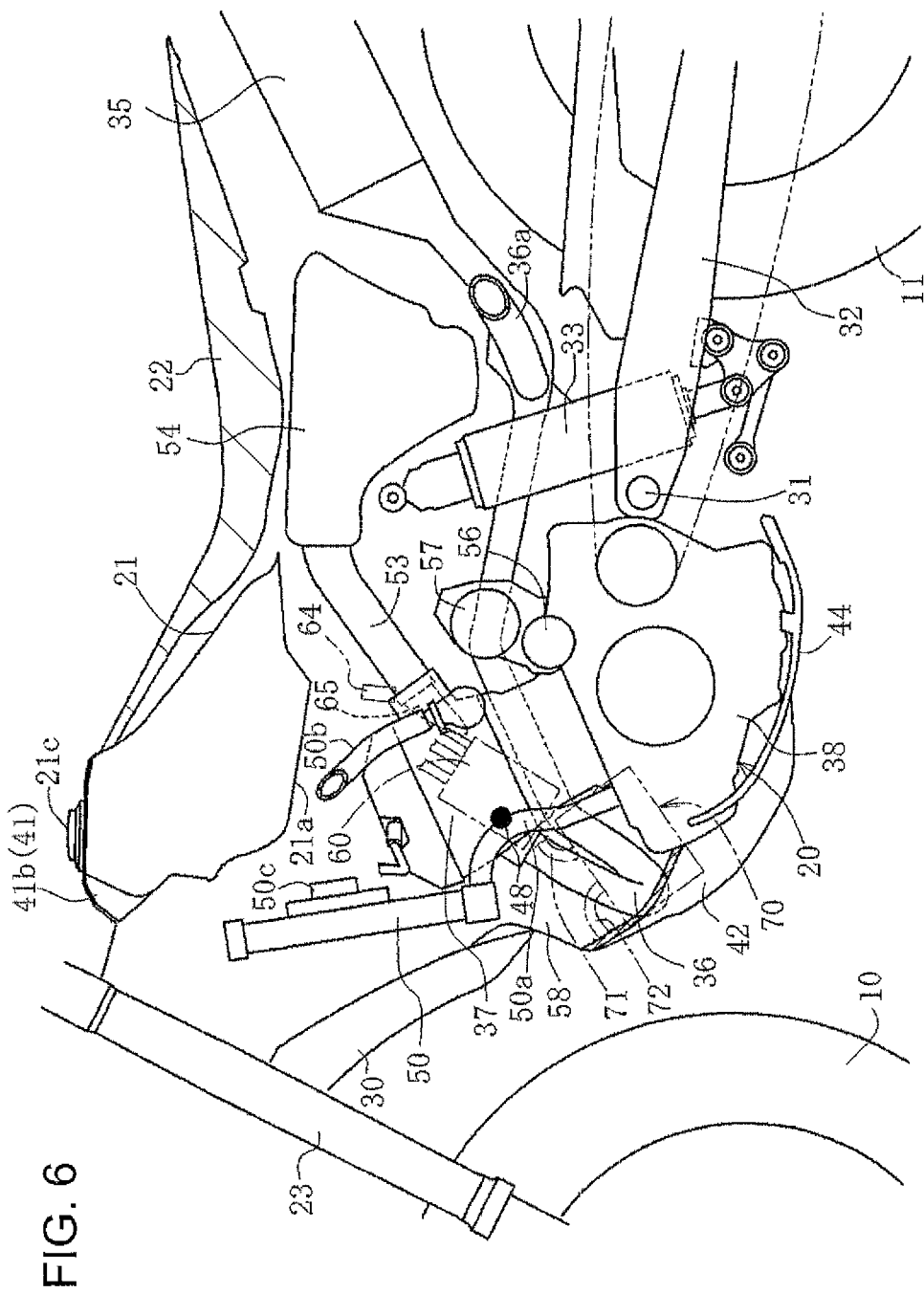
FIG. 6 is across sectional view taken on line 6-6 of FIG. 2.

As shown in FIG. 6, an intake port opens on the back side of the cylinder section 37, and the air is introduced into the intake port through a connecting tube 53 from an air cleaner 54 arranged below the seat 22. An exhaust port opens on the front side of the cylinder section 37, and the upstream end portion of the exhaust pipe 36 is connected to the exhaust port. The exhaust pipe 36 is configured to extend forwardly of the cylinder section 37, then to be bent to the right of the vehicle body in a curved fashion, and to extend rearwardly while passing through the right lateral side of the cylinder section 37, so that it is connected to the muffler 35 in a location below the seat 22.

Herein, the exhaust pipe 36 is bifurcated at the rear of the cylinder section 37, and a branch pipe 36a extends toward the left side of the vehicle body so as to be connected to the muffler 35 on the left side of the vehicle body. The other pipe keeps the route thereof so as to be connected to the muffler 35 on the right side. With this arrangement, the exhaust efficiency can be enhanced to thereby improve output power.

To a front lower part of the cylinder section 37 there is connected a feed water hose 50a, which extends from a lower tank 50e of the radiator 50, and cooling water is fed through the feed water hose 50a into the cylinder section 37 by a water pump (not shown). A return hose 50b extends from a rear upper part of the cylinder section 37 and is connected to an upper tank 50d of the radiator 50, so that hot water after having cooled the cylinder section 37 is returned to the radiator 50.

In the crankcase section 38 there is provided a generator 55, which is arranged coaxial with a crankshaft (not shown). A starter motor 56 is arranged in the vicinity of a base part of the cylinder section 37 located in an obliquely upward position of the generator 55. A canister 57, which is formed in a cylindrical shape larger than the starter motor 56 and configured to collect vaporizing fuel is arranged above the starter motor 56 and at the rear of the cylinder section 37.

A bottom portion 21c of the fuel tank 21 is located above the cylinder section 37, and the radiator 50 is located in such a way as to close a space between the bottom portion 21c and the upper part of the cylinder section 37. A cooling fan 50c of the radiator 50 faces into this space.

Figure 7:
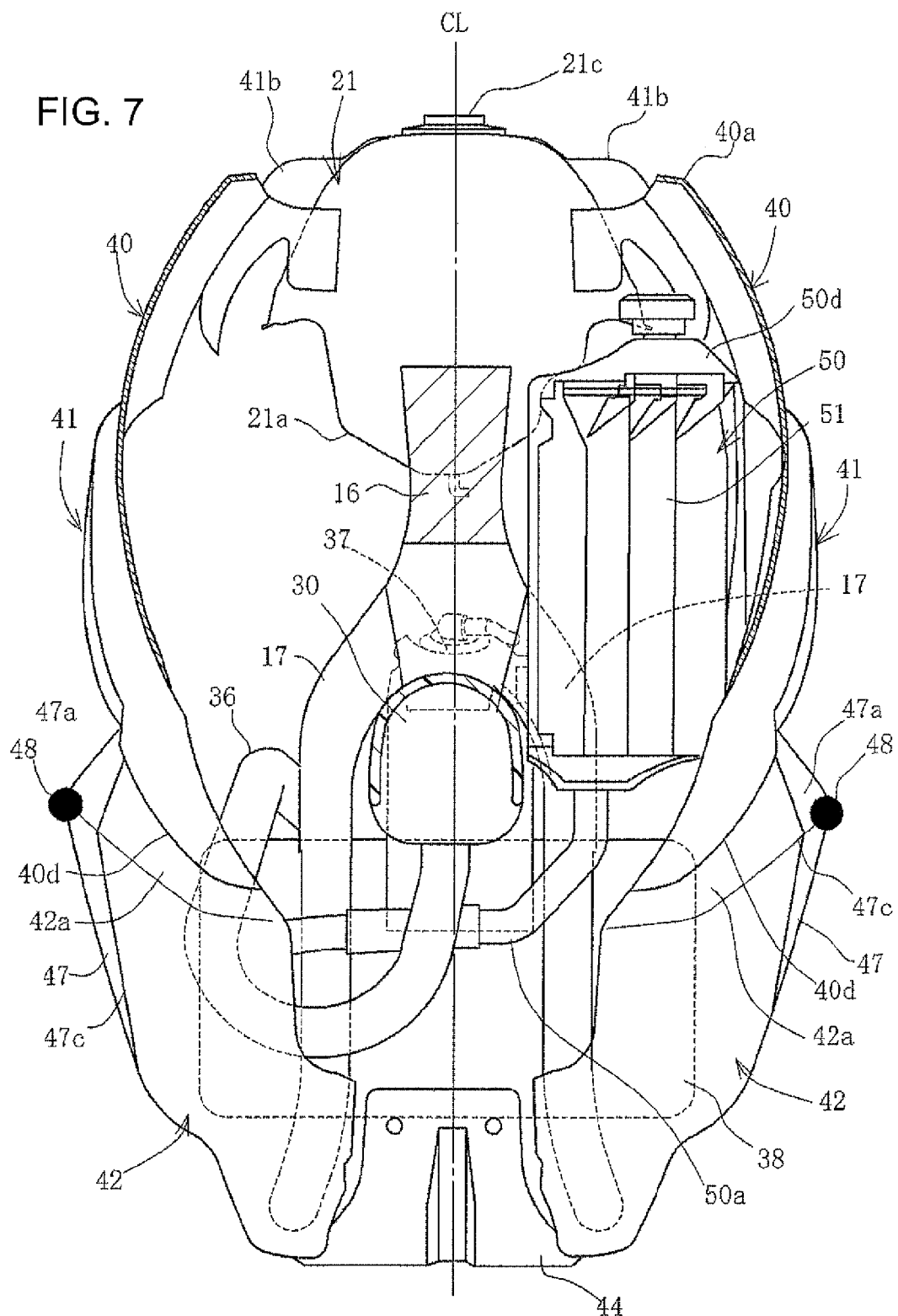
FIG. 7 is a cross sectional view taken on line 7-7 of FIG. 1.

As shown in FIG. 7, the radiator 50 is arranged in an inside space of the tank shroud 40 located on the left lateral side of the cylinder section 37. The radiator 50 is accommodated inside of the tank shroud 40.

A fin 51 is provided on a front of the radiator 50 and configured to efficiently guide the traveling air introduced from the air inlet port 46, to the radiator 50. By the way, the radiator 50 is not arranged in the air inlet port 46 on the right side of the vehicle body, and the exhaust pipe 36 is visible instead.

Namely, the radiator 50 and the exhaust pipe 36 are arranged separately on the left and right sides of the vehicle body center CL.

The exhaust pipe 36 extends forwardly from the front of the cylinder section 37 while passing below the down frame 16 and between the left and right lower frames 17, and then is bent to the right of the vehicle body, whereby to be arranged in the inside space by utilizing the swelling portion of the side cover 41 on the right side of the vehicle and the under cover 42. Although an intermediate part of the exhaust pipe 36 becomes a little higher at a lateral area of the cylinder section 37, a position of the highest part thereof is located on substantially the same level as the apex 48.

The feed water hose 50a of the radiator 50 extends across and along an upper side of the crankcase 38 to the right of the vehicle body while crossing a lower part of the exhaust pipe 36 and is connected to a right lower lateral side of the cylinder section 37.

Further, the left and right under covers 42 are separated apart from the vehicle body center CL, and the engine guard 44 is arranged between the left and right under covers 42. The engine guard 44 covers a front side and a lower side of the crankcase section 38, which are not covered with the under covers 42.

The engine guard 44, as shown in FIG. 6, is a member that covers a lower part of the crank case section 38. The engine guard 44 is made of rigid material such as metal or the like and is a single member extending from the front side to the rear side of the crankcase section 38 in a curved fashion while passing below a bottom of the crankcase section 38, whereby to be configured to guard the lower part of the crankcase section 38.

Figure 8:
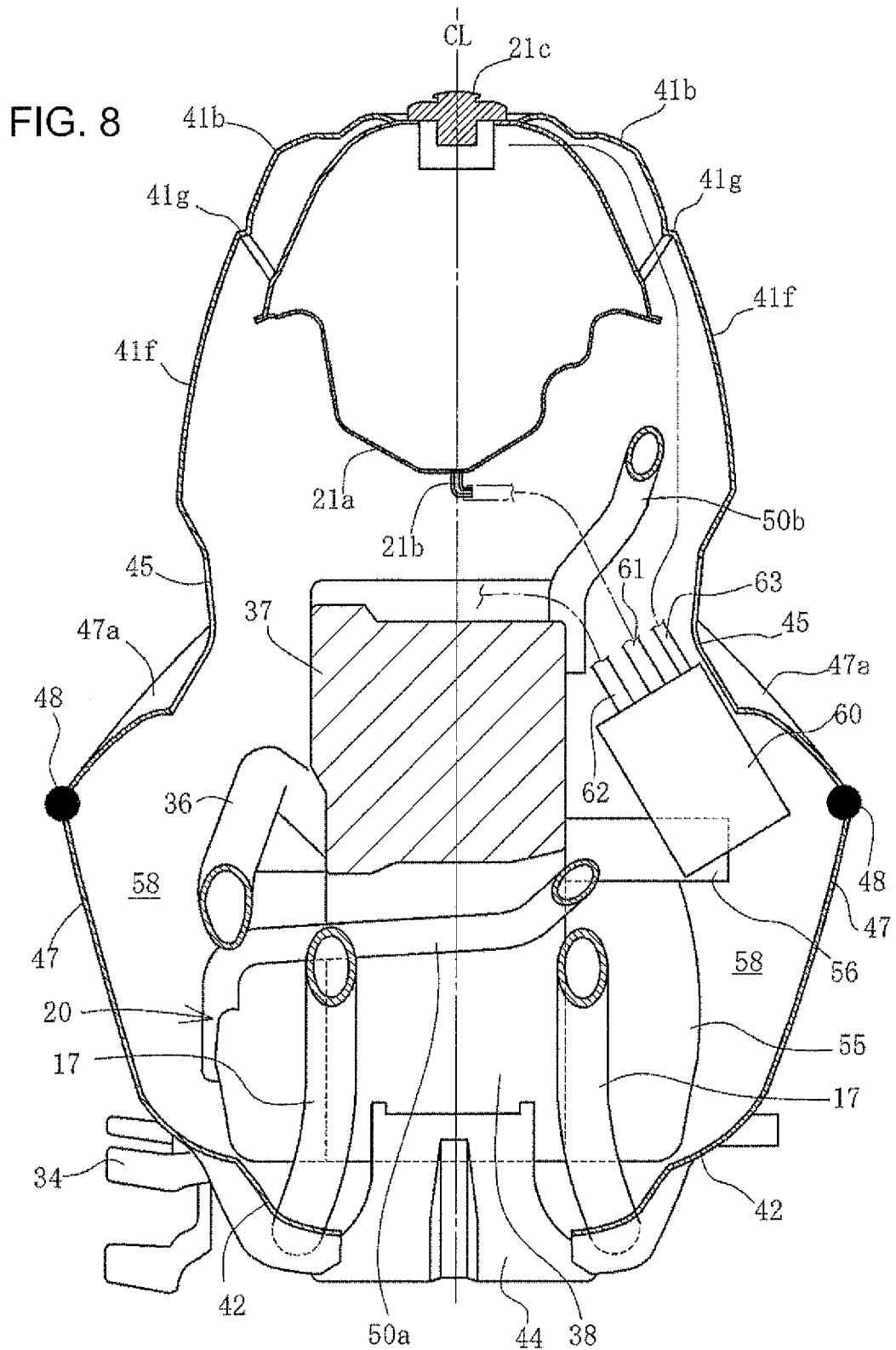
FIG. 8 is a cross sectional view taken on line 8-8 of FIG. 1.

Next, an arrangement of the electrical components within the swelling space 58 will be described. As shown in FIG. 8, the apexes 48 of the side covers 41 are located on the lateral sides of the cylinder section 37, and the swelling space 58 is formed on the insides of the apexes 48. A fuel pump 60 as an example of the electrical components of the present invention is arranged in a position overlapping with the left lateral side of the cylinder section 37 within the swelling space 58 and supported on a proper position such as an upper part of the lower frame 17 or the like.

The apex 48 is located apart from the lateral side of the cylinder section 37. A part of the swelling portion 47 extending downwardly of the apex 48 thereof has a downwardly and inwardly inclined surface, which varies in such a way as to enter gradually inwardly of the vehicle body in the downward direction. The swelling space 58 is formed among lateral surfaces of the engine 20, the swelling portions 47 and the under covers 42.

The generator (ACG cover is shown in the drawing) 55 projects laterally leftward on the left side of the crankcase section 38, and above the generator 55, the starter motor 56 projects further leftward. On the inside of the swelling portion 47, the fuel pump 60 is arranged in a forward part of the swelling space 58 in such a way as to stay clear of the starter motor 56.

The fuel pump 60 is arranged longitudinally. Below the upper bump section 47a, the fuel pump 60 is arranged to be inclined such that an upper side of the fuel pump 60 is oriented toward the cylinder section 37 along the upper bump section 47a, and that the upper end portion of the fuel pump 60 is located toward the rear of the vehicle body and the lower end portion thereof is located toward the front of the vehicle body.

Since the fuel pump 60 in this embodiment is not installed in an interior of the fuel tank 21 but disposed separately therefrom, a bottom part 21a of the fuel tank 21 located above the fuel pump 60 dispenses with a large flat portion for mounting the fuel pump 60 thereon and has a middle portion, which is formed in a more downwardly projecting shape, whereby to contribute to an increase in a tank capacity. A fuel delivery pipe 21b is provided so as to project downwardly at a lowermost portion of the bottom part 21a. This fuel delivery pipe 21b is connected through fuel piping 61 to the fuel pump 60.

The fuel pump 60 is of relatively large substantially cylindrical shape. The fuel piping 61, fuel discharge piping 62 and an air bleeder pipe 63 are connected to an upper surface of the fuel pump 60. The fuel piping 61 is configured to feed the fuel from the fuel tank 21 into the fuel pump 60. The fuel piping 61 functions as fuel feed piping from the fuel tank 21.

The fuel pressurized within the fuel pump 61 is discharged at a high pressure through the fuel discharge piping 62 of the fuel pump 60 into a fuel injection device 64. As shown in FIG. 6, the fuel injection device 64 is arranged at the rear of the cylinder section 37 so as to inject the fuel into the intake port 65, which is provided on the back side of the cylinder section 37.

The air bleeder pipe 63 is connected to the upper part of the fuel tank 21 so as to have mixed air returned into the fuel tank 21.

The swelling space 58 has a relatively large capacity due to the formation of the swelling portion 47 and the apex 48, so that a large sized component part such as the fuel pump 60 can be accommodated and arranged therein. In addition, since the fuel pump 60 is inclined along the upper bump section 47a, the arrangement having good space efficiency may be achieved.

In addition, since the fuel pump 60 is arranged in the cradle C, the fuel pump 60 can be easily supported on the cradle C part of the vehicle body frame 12 and be protected effectively by the cradle C.

By the way, the electrical component to be arranged within the swelling space 58 is not limited to the fuel pump 60, and various components are conceivable. For example, an ABS unit 70 shown by a phantom line in FIG. 6 is able to be arranged. The ABS unit 70 has an oil hydraulic motor and an oil pressure control valve. It is connected through front brake piping 71 to a hydraulic caliper of a front brake so as to control the oil pressure of the front brake, and also connected through rear brake piping 72 to a hydraulic caliper of a rear brake so as to control the oil pressure of the rear brake. The oil pressures of the front brake and the rear brake are controlled by the ABS unit 70 in such a way as to avoid a slip.

Although this ABS unit 70 is a relatively large and heavy electrical component, a sufficient arrangement space is ensured by the swelling space 58, so that it can be accommodated and arranged in the swelling space 58 in such a way as to be arranged in a horizontally extending and forwardly inclined fashion, for example. Herein, as the ABS unit 70, there may be employed not only a type that controls the front and rear brakes at the same time but also a type that controls either one of the front and rear brakes.

Moreover, since the ABS unit 70 is located within the cradle C, it can be easily supported on the cradle C part of the vehicle body frame 12 and be protected effectively by the cradle C.

Next, the operation of this embodiment will be described. As shown in FIG. 8, since the exhaust pipe 36 of a heavy load and the fuel pump 60 as the electrical component are arranged separately on the left and right sides of the vehicle body in the inside space of the side cover 41, the electrical component (the fuel pump 60) can be arranged so as not to be influenced by the heat of the exhaust pipe 36. Moreover, since these heavy loads are located within the side cover 41 below the thank shroud 40, it is possible to lower a center of gravity of the vehicle. In addition, since the apex 48 of the swelling portion 47 is located in the cradle C, the electrical component (the fuel pump 60) can be supported on and protected by the vehicle body frame 12 of a closed loop shape in the side view. Therefore, also in the off road vehicle having a cradle type vehicle body frame, the large electrical component such as the fuel pump 60 or the like can be arranged in front of the rider's legs.

As shown in FIG. 7, since the apex 48 of the swelling portion 47 is located on the lateral side of the cylinder section 37, the swelling space 58 can be increased in the vehicle width direction. Moreover, since the apex 48 is arranged rearwardly of the radiator 50 as shown in FIG. 6, the space containing the swelling space 58 located rearwardly from the radiator 50 can be increased so as to make it easy to introduce the fresh air into or around the radiator 50, so that the cooling efficiency of the radiator 50 can be improved.

As shown in FIG. 5, since the tank shroud 40, the side cover 41 and the under cover 42 are formed as separate components from each other, each of these components can be replaced separately. Therefore, when the side cover 41 having the swelling portion 47, which is relatively subject to damages is damaged, only the side cover 41 is replaceable, whereby the cost of replacement parts can be reduced. As a matter of course, when the under cover 42 having the swelling portion is damaged, the under cover 42 can be replaced separately.

As shown in FIG. 8, since the fuel pump 60, which is not built in the fuel tank 21 but located separately to be attached externally is arranged within the side cover 41, and the fuel piping 61, 62, etc. are covered with the side cover 41 so as to be made invisible from outside, the external appearance can be improved while protecting the fuel piping.

Moreover, since the fuel pump 60 is arranged on the outside of the fuel tank 21, the bottom of the fuel tank, for example, is extended downward accordingly so as to increase the capacity. Therefore, the fuel tank 21 can be made larger in size without exerting an influence upon the external appearance part, and it can be increased in size without impairing the external appearance.

As shown in FIG. 8, since the fuel pump 60 is formed in a cylindrical shape, which has the upper end surface connected to the fuel piping 61 for feeding the fuel, and the upper end portion is arranged so as to be inclined toward the inside of the vehicle body, the fuel piping 61 can be directed to the center of the vehicle body so as to be connected to the fuel tank 21 located in the center of the vehicle body, whereby the fuel piping 61 can be shortened.

As shown in FIG. 8, the fuel pump 60 is formed in a cylindrical shape that has the upper end surface connected to the fuel discharge piping 62 for discharging the fuel to the fuel injection device 64. The fuel pump 60 is arranged such that on the lateral side of the cylinder section 37, the upper end portion is located toward the rear of the vehicle body and the lower end portion is located toward the front of the vehicle body (see FIG. 9). Therefore, the fuel discharge piping 62 can be connected at a short distance to the fuel injection device 64 arranged at the rear of the cylinder section 37. As a result, the fuel discharge piping 62 can be shortened.

As shown in FIG. 7, since the ABS unit 70 is arranged within the swelling space 58 formed on the inside of the swelling portion 47, the ABS unit 70 having heavy weight can be located between the front wheel 10 and the rear wheel 11, whereby the mass can be concentrated. The ABS unit 70 is located on the lateral side of the engine 20, so that the oil pressure piping 71, 72 can be shortened.

Accordingly, also in the off road vehicle having the cradle type vehicle body frame 12, the heavy ABS unit 70 can be arranged in front of the rider's legs.

By the way, either of the fuel pump 60 and the ABS unit 70 may be freely arranged selectively, and also both of them may be arranged at the same time.

Further, although the present invention is applied to the off road vehicle, the vehicle is not limited to the two-wheeled motorcycle as far as it is a straddle type vehicle.

In addition, as the engine 20, both a water cooled type and an air cooled type are applicable. The traveling air introduced into the tank shroud 40 cools the radiator 50 in the case of the water cooled engine whereby the engine is cooled indirectly. In the case of the air cooled engine, it cools the engine directly.

Further, in the above embodiment, the electrical components (the fuel pump 60 and the ABS unit 70) are supported on and protected by the cradle C of the vehicle body frame 12 in a suitable condition. However, other than the direct protection of the electrical component by the vehicle body frame, the electrical component may be indirectly supported on and protected by a stay or a protection member mounted on the vehicle body frame.

Further, the front vehicle body cover may be wholly or partially integrated. Any of multiple front vehicle body cover components may be integrally formed with another component, such as a combination between the tank shroud 40 and the side cover 41, for example, and other components may be formed separately

DESCRIPTION OF REFERENCE CHARACTERS

20: Engine, 21: Fuel tank, 35: Muffler, 36: Exhaust pipe, 37: Cylinder section, 38: Crankcase section, 40: Tank shroud, 41: Side cover, 42: Under cover, 47: Swelling portion, 48: Apex, 50: Radiator, 58: Swelling space, 60: Fuel pump (Electrical component), 70: ABS unit (Electrical component, C: Cradle

What is claimed is:

1. A body cover structure of a straddle type vehicle comprising:
    a cradle type vehicle body frame that includes a head pipe, left and right main frames extending rearwardly from the head pipe, left and right pivot frames, which are connected to rear parts of the main frames and extend downwardly so as to be provided with a pivot shaft, a down frame extending downwardly from the head pipe, and left and right lower frames, which are connected to a lower part of the down frame and extend rearwardly so as to be connected to lower parts of the pivot frames;
    an engine supported below the main frames and in front of the pivot frames;
    a fuel tank supported on the left and right main frames above the engine;
    a seat supported at the rear of the fuel tank; and
    a vehicle body cover for covering a lateral part of the vehicle body;
    wherein the body cover includes left and right tank shroud sections that are arranged so as to extend forwardly from the fuel tank so as to take in traveling air to cool the engine, and a side cover section arranged to cover a lateral side of the fuel tank and a front part of the seat, the side cover section is provided with a swelling portion provided in a lower front part of the side cover portion and swelling laterally beyond the tank shroud sections below the fuel tank so as to cover at least a part of the lower frames in a swelling fashion and has an apex of the swelling portion located in a cradle of the vehicle body frame in a side view; and
    wherein an exhaust pipe and an electrical component are arranged separately on the left and right sides of the vehicle body in an inside space of the swelling portion.

2. The body cover structure of a straddle type vehicle according to claim 1, further comprising a radiator, which is arranged at least on the same side of the electrical component within the left and right tank shroud sections, wherein the engine includes a cylinder section and a crankcase section extending outwardly in the left and right directions below the cylinder section, and wherein the apex is located on a lateral side of the cylinder section and at the rear of the radiator, and an air outlet port is formed in either one or both of the left and right tank shroud sections and the side cover section and located at the rear of the radiator on the upper side of the apex.

3. The body cover structure of a straddle type vehicle according to claim 1, wherein the side cover section is arranged at the rear of the tank shroud section so as to cover the main frames and a cylinder section of the engine from lateral sides and provided with the apex, and an under cover section is connected to a front part of the side cover section and a lower part of the tank shroud section, and wherein the tank shroud section, the side cover section and the under cover section are formed as separate components from each other.

4. The body cover structure of a straddle type vehicle according to claim 3, wherein the electrical component is a fuel pump arranged on an outside of the fuel tank, and fuel piping is arranged between the fuel pump and the fuel tank, and wherein the under cover section is configured to cover a front part of the lower frame and at least a portion of a lateral part of the fuel tank in a side view.

5. The body cover structure of a straddle type vehicle according to claim 4, wherein the fuel pump is a cylindrical member having an upper end surface connected to the fuel piping for feeding fuel, and is arranged so as to be inclined such that an upper end portion is located on an inward side of the vehicle body and a lower end portion is located on an outward side of the vehicle body.

6. The body cover structure of a straddle type vehicle according to claim 5, wherein the fuel pump is a cylindrical member having the upper end surface connected to fuel discharge piping for discharging the fuel to a fuel injection device, and is arranged such that on the lateral side of the cylinder section, the upper end portion is located toward the rear of the vehicle body and the lower end portion is located toward the front of the vehicle body, and the fuel injection device is arranged at the rear of the cylinder section so as to inject the fuel into an intake port which is provided on a back side of the cylinder section.

7. The body cover structure of a straddle type vehicle according to claim 1, wherein the electrical component is an ABS unit that controls a brake for a front wheel and a rear wheel.

8. The body cover structure of a straddle type vehicle according to claim 2, wherein the side cover section is arranged at the rear of the tank shroud section so as to cover the main frames and the cylinder section from lateral sides and provided with the apex, and an under cover section is connected to a front part of the side cover section and a lower part of the tank shroud section, and wherein the tank shroud section, the side cover section and the under cover section are formed as separate components from each other.

9. The body cover structure of a straddle type vehicle according to claim 8, wherein the electrical component is a fuel pump arranged on an outside of the fuel tank, and fuel piping is arranged between the fuel pump and the fuel tank, and wherein the under cover section is configured to cover a front part of the lower frame and at least a portion of a lateral part of the fuel tank in a side view.

10. The body cover structure of a straddle type vehicle according to claim 9, wherein the fuel pump is a cylindrical member having an upper end surface connected to the fuel piping for feeding fuel, and is arranged so as to be inclined such that an upper end portion is located on an inward side of the vehicle body and a lower end portion is located on an outward side of the vehicle body.

11. The body cover structure of a straddle type vehicle according to claim 10, wherein the fuel pump is a cylindrical member having the upper end surface connected to fuel discharge piping for discharging the fuel to a fuel injection device, and is arranged such that on the lateral side of the cylinder section, the upper end portion is located toward the rear of the vehicle body and the lower end portion is located toward the front of the vehicle body, and the fuel injection device is arranged at the rear of the cylinder section so as to inject the fuel into an intake port which is provided on a back side of the cylinder section.

12. The body cover structure of a straddle type vehicle according to claim 2, wherein the electrical component is an ABS unit that controls a brake for a front wheel and a rear wheel.

13. The body cover structure of a straddle type vehicle according to claim 3, wherein the electrical component is an ABS unit that controls a brake for a front wheel and a rear wheel.

14. The body cover structure of a straddle type vehicle according to claim 8, wherein the electrical component is an ABS unit that controls a brake for a front wheel and a rear wheel.

* * * * *